April 28, 1953    C. R. WILLIAMS    2,636,530
FOOD CHOPPER CONSTRUCTION AND KNIFE THEREFOR
Filed Dec. 28, 1951
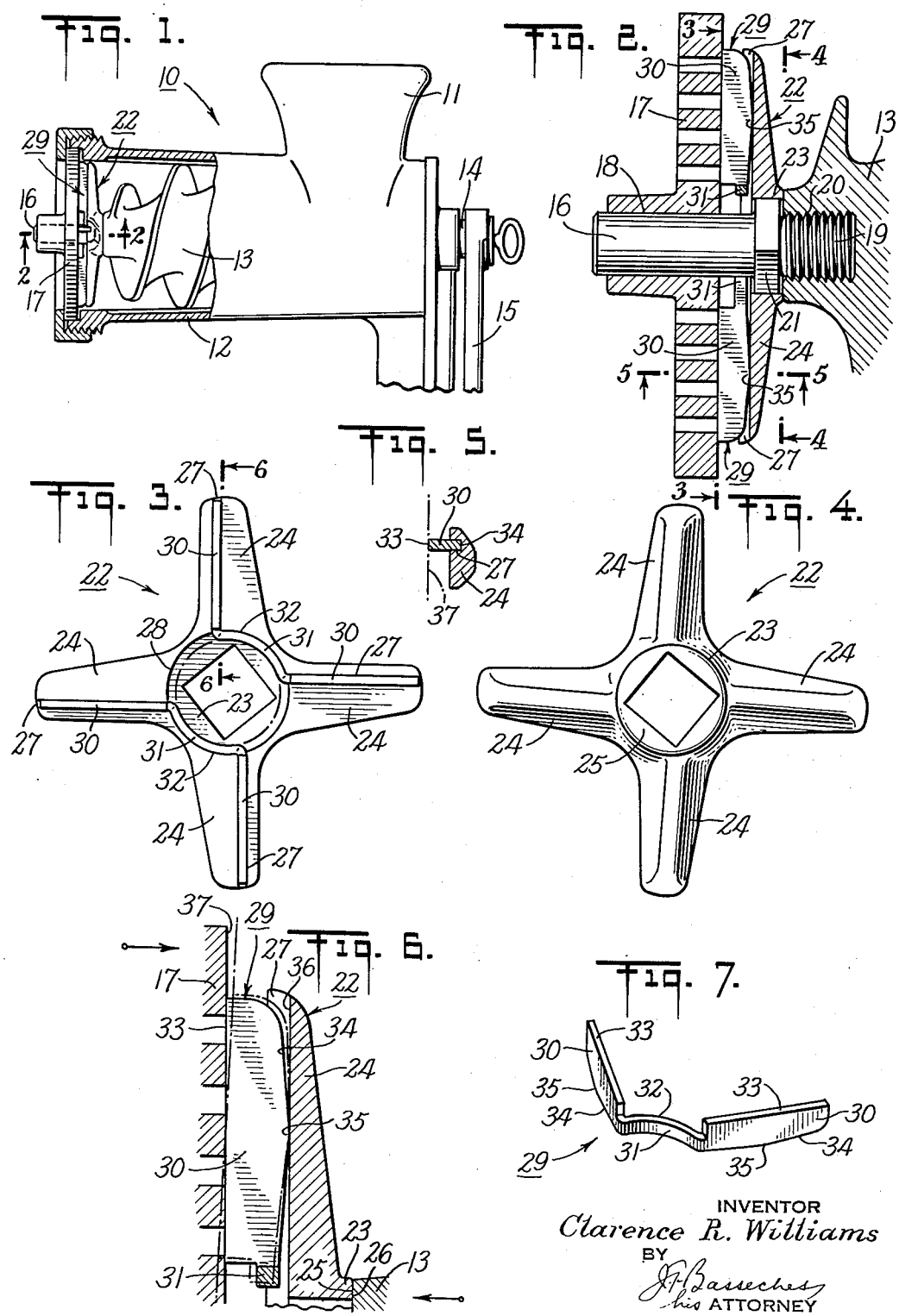
INVENTOR
Clarence R. Williams
BY
J.H. Basseches
his ATTORNEY Patented Apr. 28, 1953

2,636,530

UNITED STATES PATENT OFFICE 2,636,530

FOOD CHOPPER CONSTRUCTION AND KNIFE THEREFOR

Clarence R. Williams, Brooklyn, N. Y., assignor to Atlantic Service Company, Inc., Brooklyn, N. Y., a corporation of New York Application December 28, 1951, Serial No. 263,764

2 Claims. (Cl. 146—189)

1

This invention relates to food choppers and knives therefor.

This invention is an improvement of the food chopper construction and knife disclosed in Patent No. 1,986,933 of January 8, 1935, issued to Charles A. Laemmel.

In the aforementioned Laemmel patent there is described a claim for a food chopper construction including a knife held within a frame, providing in a measure simplicity of renewal of the knife elements and at the same time endeavoring to retain a degree of self-aligning between the face of the perforated plate of the cutter and the knife.

In said patent the construction there described was found to be relatively slow in effecting the replacement of the blades in the frame therefor, in that an unsymmetrical arrangement existed and that the retention substantially radially as well as circumferentially of a resilient web resulted in objectionable wear and inefficient cutter operation, characterized by the collection of sinews and unchopped meat which entwines itself around the holder frame and shaft, resulting in misalignment of the contacting surface due to resilient displacement and unsymmetrical pressure in sealing the frame and intermediate knife upon the perforated plate.

Accordingly, it is an object of this invention to provide an improved food or meat chopper assembly and knife therefor characterized by the features that a knife frame may have assembled therewith blades fitting within the frame in a plurality of seats, whereby replacement may be effected speedily and without encountering asymmetrical positions slowing up the replacement work; characterized by the elimination of problems tending to form obstructions at the hub by accumulated sinews and unchopped meat and facilitating the quick removal of any of these entwined meat elements; and further characterized by reduction in the obstructions adjacent the hub, tending to pile up unchopped sinews and uncut meat which may block the free passage of the meat through the perforated plate, and further to provide a frame or knife holder which is symmetrically pressed against the perforated plate to reduce distortion of the blade, tending to cause wear on the perforated plate and loss in grinding efficiency.

To attain these objects and such further objects as may appear herein or be hereinafter pointed out, I make reference to the accompanying drawing, forming a part hereof, in which—

Figure 1 is a side elevation, partly in section,

2 showing the knife assembly against the perforated plate in accordance with my invention;

Figure 2 is a magnified sectional view on the line 2—2 of Figure 1;

Figure 3 is a magnified face view of the carrier or frame, with the blades fitted in accordance with my invention;

Figure 4 is a rear view of the carrier frame;

Figure 5 is a fragmentary section on the line 5—5 of Figure 2;

Figure 6 is a fragmentary magnified section taken along the line 6—6 of Figure 3;

Figure 7 is a perspective view of the knife in accordance with this invention.

Referring to the drawing, there is shown a representative type of food chopper or grinder 10 having the usual fill hopper 11, leading to a tubular casing 12, within which the screw 13 rotates, and comprising a shaft 14 on one end, to which a handle or lever 15 is connected to supply the motive power, it being understood that a gear or belt connected to some source of power may serve as the driving means, where manual means are not employed. The screw 13 has its shaft end 16 rotatably supported in a perforated plate 17, having a bearing 18. The shaft 16 may be integral with the screw, although preferably it is screw threaded at 19 into a threaded boring 20, to facilitate replacement with a more highly tempered shaft in accordance with conventional practice.

The shaft 16 has a squared keying segment 21 upon which is mounted the cutter frame 22 by providing the same with a cooperative keyed aperture in the hub 23. The frame 22 is provided with arms 24 which, adjacent the hub, merge into a pressure face 25 at the leading edge of the plate, forming a pressure seat for thrust contact with the edge 26 of the screw 13. The trailing or front face of the frame is formed on the arms with grooves 27 which are radially offset on the arms 24 and merge adjacent the hub into an annulus 28, providing a symmetrical flange about the center of the frame assembly.

With the construction as provided, I employ a knife couplet 29, shown in Figure 7, comprising a pair of blades 30 joined by a web or bridge member 31. The web or bridge member 31 arcuately conforms to the annulus 28, to make intimate contact therewith on its outer peripheral surface 32 when applied in position, as will appear hereafter, and is reduced in depth from the cutting edges 33.

The blades 30, on their back portion 34, are formed with a crown or bearing edge 35, which is positioned with respect to the pressure face 25 to provide a distributed pressure with regard to the wall 36 of the groove 27, to assure alignment of the cutter face 33 with the face 37 of the plate 17.

The blade arms 30, 30 are joined to each other approximately at an angle corresponding to the eccentric radial position of the grooves 27 in adjacent arms 24 of the frame 22, but symmetrical to the bridge or web 31 and the center of the arc defining the bridge 31, so that the blades 30 may snap into position frictionally in any adjacent pair of grooves 27 formed in the arms 24. Thus, sufficient springing is provided to provide symmetrical mounting in any pair of adjacent arms so that any one pair of the four positions may be employed to position the symmetrical blades with the web or bridge 31 snugly fitting the annulus 28, providing a smooth interior at the hub and restraining the crown or bearing 35 concentric with the axial line through the shaft 16 in all positions of the blade within the frame.

Thus, by the construction of the integrated knife blades, symmetry for speedy production and attachment or removability from any adjacent pair of slots is provided, with a snap action engagement due to the resiliency of the connection.

The radial positioning of the crown or pressure point 35 from the arcuate web 31 assures no relative displacement of the pressure point 35 with respect to the bearing 25 in the end thrust to which the knife frame assembly is subjected, thereby securing a balanced pressure in all operating conditions, no matter how much tension is applied, as there is a minimizing of any radial shifting with respect to the annulus 28.

By the foregoing construction unchopped meat may move freely, without obstruction, and sinews or like tough material will not alter the setting or form such an obstruction by entwining about the hub to block the passages of the perforated plate. Thus, greater efficiency and long life, as well as speedy replacement, are made possible.

Having thus described my invention and illustrated its use, what I claim as new and desire to secure by Letters Patent is:

1. A knife for meat choppers including a frame therefor having a central hub and radial arms extending from the hub, the arms having symmetrically spaced grooves merging into a central depressed circular annulus in the hub providing a symmetrical arcuate flange between each set of adjacent arms, said knife having a pair of cutter blades substantially radially congruent to a pair of said spaced grooves, a web joining said blades to each other and forming a bridge member between the blades and conforming arcuately to the arcuate flange portions of the annulus and being of reduced depth to nest within the annulus and spaced away from the cutting edges of the blades, the bridge joining the blades forming a substantially free passage minimizing obstruction by accumulated sinews and uncut meat in use, and the symmetrical mounting of blades permitting insertion in any adjacent pair of grooves in the arms of the frame.

2. A meat chopper assembly comprising a frame having a central hub and radial arms extending from the hub, one face whereof having a pressure seat and the opposite face having on the arms thereof grooves merging into a centrally depressed annulus in the hub, providing in the hub symmetrical flanges between each set of arms, a knife having a pair of cutter blades substantially radially congruent to said spaced grooves, a web joining said blades to each other forming a bridge member between the blades and conforming arcuately to the flange portions of the annulus in the hub, said bridge being of a reduced depth to nest within the annulus and spaced from the cutting edges of the blades, the bridge joining the blades forming a substantially free passage minimizing obstruction by accumulated sinews and uncut meat in use, and the symmetrically mounted blades permitting insertion in any adjacent pair of grooves in the arms of the frame.

CLARENCE R. WILLIAMS.

References Cited in the file of this patent

UNITED STATES PATENTS

| Number | Name | Date |
|--------|------|------|
| 1,986,933 | Laemmel | Jan. 8, 1935 |